(12) United States Patent
Craig et al.

(10) Patent No.: US 8,628,323 B2
(45) Date of Patent: Jan. 14, 2014

(54) INJECTION MOLDING SYSTEM INCLUDING A MELT FILTER, THE FILTER BEING LOCATED BEFORE FIRST INSTANCE OF MELT ACCUMULATION

(75) Inventors: Denise Davina Craig, Etobicoke (CA); Raymond Weiping Zhang, Brampton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 283 days.

(21) Appl. No.: 13/375,254

(22) PCT Filed: May 28, 2010

(86) PCT No.: PCT/CA2010/000780
§ 371 (c)(1),
(2), (4) Date: Nov. 30, 2011

(87) PCT Pub. No.: WO2010/148478
PCT Pub. Date: Dec. 29, 2010

(65) Prior Publication Data
US 2012/0082753 A1 Apr. 5, 2012

Related U.S. Application Data

(60) Provisional application No. 61/220,415, filed on Jun. 25, 2009.

(51) Int. Cl.
*B29C 45/53* (2006.01)
(52) U.S. Cl.
USPC .................. 425/557; 264/328.17; 264/328.19
(58) Field of Classification Search
USPC .................. 425/145, 557; 264/328.17, 328.19
See application file for complete search history.

(56) References Cited

U.S. PATENT DOCUMENTS 3,870,445 A 3/1975 Hold et al.
3,937,776 A 2/1976 Hold et al.
(Continued)

FOREIGN PATENT DOCUMENTS

DE 4236581 A1 9/1993
DE 19505984 A1 8/1996
(Continued)

OTHER PUBLICATIONS

Vince Butera, "Machine Design for Injection Molding Using Post-Consumer Resin", ANTEC, May 10, 1993.
(Continued)

*Primary Examiner* — Dimple Bodawala
*Assistant Examiner* — Emmanuel S Luk
(74) *Attorney, Agent, or Firm* — Husky Intellectual Property Services

(57) ABSTRACT

There is provided an injection unit. The injection unit comprises an extruder that is structured to continuously melt, in use, a molding material; a nozzle that is connectable, in use, to a mold; a melt accumulator that is structured to selectively buffer and transfer, in use, the molding material towards the nozzle, the melt accumulator including a first melt accumulator and a second melt accumulator selectively connectable to the extruder via a distribution assembly, and wherein each of the first melt accumulator and the second melt accumulator defines a respective melt accumulation volume; the melt accumulation volume being configured to accumulate and hold, for a first time after being molten by the extruder a volume of molding material sufficient to transfer for downstream processing; a melt filter placed before the melt accumulation volume, such that the molding material if subjected to filtering prior to entering the melt accumulation volume, the melt filter being configured to remove contaminants from the molding material.

10 Claims, 4 Drawing Sheets

(56) References Cited

U.S. PATENT DOCUMENTS

| | | | |
|---|---|---|---|
| 4,094,940 A | 6/1978 | Hold | |
| 4,167,384 A * | 9/1979 | Shirato et al. | 425/183 |
| 4,311,446 A | 1/1982 | Hold et al. | |
| 4,390,332 A | 6/1983 | Hendry | |
| 4,814,186 A * | 3/1989 | Trott | 425/199 |
| 4,965,028 A * | 10/1990 | Maus et al. | 264/297.2 |
| 5,090,887 A * | 2/1992 | Gneuss | 425/185 |
| 5,158,725 A | 10/1992 | Handa et al. | |
| 5,246,660 A * | 9/1993 | Tsutsumi | 264/328.17 |
| 5,253,994 A * | 10/1993 | Zweig et al. | 425/130 |
| 5,417,866 A * | 5/1995 | Trott | 210/791 |
| 6,010,625 A * | 1/2000 | Whitman | 210/236 |
| 6,196,820 B1 * | 3/2001 | Straka | 425/84 |
| 6,241,932 B1 * | 6/2001 | Choi et al. | 264/328.8 |
| 6,514,440 B1 | 2/2003 | Kazmer et al. | |
| 6,558,603 B2 * | 5/2003 | Wobbe et al. | 264/297.2 |
| 6,576,179 B1 * | 6/2003 | Abe et al. | 264/328.18 |
| 6,821,101 B2 * | 11/2004 | Kohler et al. | 425/130 |
| 7,004,616 B2 * | 2/2006 | Murakami et al. | 366/75 |
| 7,411,163 B2 * | 8/2008 | Gneuss | 219/497 |
| 8,501,059 B2 * | 8/2013 | Schultz | 264/40.5 |
| 2004/0082690 A1 | 4/2004 | Kawahara et al. | |
| 2008/0290538 A1 * | 11/2008 | Biesenberger | 264/40.3 |
| 2011/0017681 A1 * | 1/2011 | Bibey et al. | 210/791 |
| 2012/0068373 A1 * | 3/2012 | Craig et al. | 264/40.6 |
| 2012/0074607 A1 * | 3/2012 | Schultz | 264/40.5 |
| 2012/0306113 A1 * | 12/2012 | Kershaw et al. | 264/40.7 |

FOREIGN PATENT DOCUMENTS

| | | |
|---|---|---|
| DE | 19715229 A1 | 10/1998 |
| DE | 10118486 A1 | 10/2002 |
| EP | 0225134 A2 | 6/1987 |
| EP | 1350611 A1 | 10/2003 |
| WO | 9841381 A1 | 9/1998 |
| WO | 2004050325 A1 | 6/2004 |
| WO | 2006125037 A2 | 11/2006 |

OTHER PUBLICATIONS

PCT International Search Report, Zhang, Pengfei, Jul. 8, 2010, 3 pages.

* cited by examiner

INJECTION MOLDING SYSTEM INCLUDING A MELT FILTER, THE FILTER BEING LOCATED BEFORE FIRST INSTANCE OF MELT ACCUMULATION

TECHNICAL FIELD

The present invention generally relates to, but is not limited to molding of molded articles and more specifically, but not limited to, an injection molding system including a melt filter, the filter being located before first instance of melt accumulation.

BACKGROUND

Molding is a process by virtue of which a molded article can be formed from molding material (such as Polyethylene Teraphalate (PET), Polypropylene (PP) and the like) by using a molding system. Molding process (such as injection molding process) is used to produce various molded articles. One example of a molded article that can be formed, for example, from PET material is a preform that is capable of being subsequently blown into a beverage container, such as, a bottle and the like.

A typical injection molding system includes inter alia an injection unit, a clamp assembly and a mold assembly. The injection unit can be of a reciprocating screw type or of a two-stage type. Within the reciprocating screw type injection unit, raw material (such as PET pellets and the like) is fed through a hopper, which in turn feeds an inlet end of a plasticizing screw. The plasticizing screw is encapsulated in a barrel, which is heated by barrel heaters. Helical (or other) flights of the screw convey the raw material along an operational axis of the screw. Typically, a root diameter of the screw is progressively increased along the operational axis of the screw in a direction away from the inlet end.

As the raw material is being conveyed along the screw, it is sheared between the flights of the screw, the screw root and the inner surface of the barrel. The raw material is also subjected to some heat emitted by the barrel heaters and conducted through the barrel. As the shear level increases in line with the increasing root diameter, the raw material, gradually, turns into substantially homogenous melt. When a desired amount of the melt is accumulated in a space at discharge end of the screw (which is an opposite extreme of the screw vis-à-vis the inlet end), the screw is then forced forward (in a direction away from the inlet end thereof), forcing the desired amount of the melt into one or more molding cavities. Accordingly, it can be said that the screw performs two functions in the reciprocating type injection unit, namely (i) plasticizing of the raw material into a substantially homogeneous melt and (ii) injecting the substantially homogeneous melt into one or more molding cavities.

The two stage injection unit can be said to be substantially similar to the reciprocating type injection unit, other than the plasticizing and injection functions are separated. More specifically, an extruder screw, located in an extruder barrel, performs the plasticizing functions. Once a desired amount of the melt is accumulated, it is transferred into a melt accumulator, which is also sometimes referred in the industry as a "shooting pot", the melt accumulator being equipped with an injection plunger, which performs the injection function.

U.S. Pat. No. 5,253,994 issued to Zweig et al. on Oct. 19, 1993 discloses a synthetic-resin article that is molded by plasticizing a virgin granulate into a fluent stream and plasticizing a recycle granulate into another fluent stream. The recycle stream is then filtered while still plasticized to removing particulate impurities from it. Then the filtered recycle stream while still plasticized is combined with the virgin stream to form a combined stream and the combined stream is fed into a mold. The stream is mechanically filtered.

U.S. Pat. No. 5,246,660 issued to Tsutsumi on Sep. 21, 1993 discloses a process and apparatus for injection molding of plastic material incorporate a perforated member for melt filtering and/or melt mixing during metering of plasticized material. The perforated member may be of a disk form mounted to a screw plunger provided within a machine body with the perforations arranged around the screw plunger. Impurities accumulated at the perforated member may be purged by rotating the screw plunger from a nozzle connected to the machine body via an annular recess formed at an inner surface of the machine body or directly from the machine body per se via a radial hole formed therein, when the screw plunger is in a predetermined position preferably in the most forward position, where the recess or the hole is located in the vicinity of the perforated member.

SUMMARY

According to a first broad aspect of the present invention, there is provided an injection unit. The injection unit comprises an extruder that is structured to melt, in use, a molding material; a nozzle that is connectable, in use, to a mold; a melt accumulator that is structured to selectively buffer and transfer, in use, the molding material towards the nozzle; one of the extruder and the melt accumulator defining a melt accumulation volume, the melt accumulation volume being configured to accumulate and hold, for a first time after being molten by the extruder a volume of the molding material sufficient to transfer for downstream processing;

DESCRIPTION OF THE DRAWINGS

A better understanding of the embodiments of the present invention (including alternatives and/or variations thereof) may be obtained with reference to the detailed description of the embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 1:
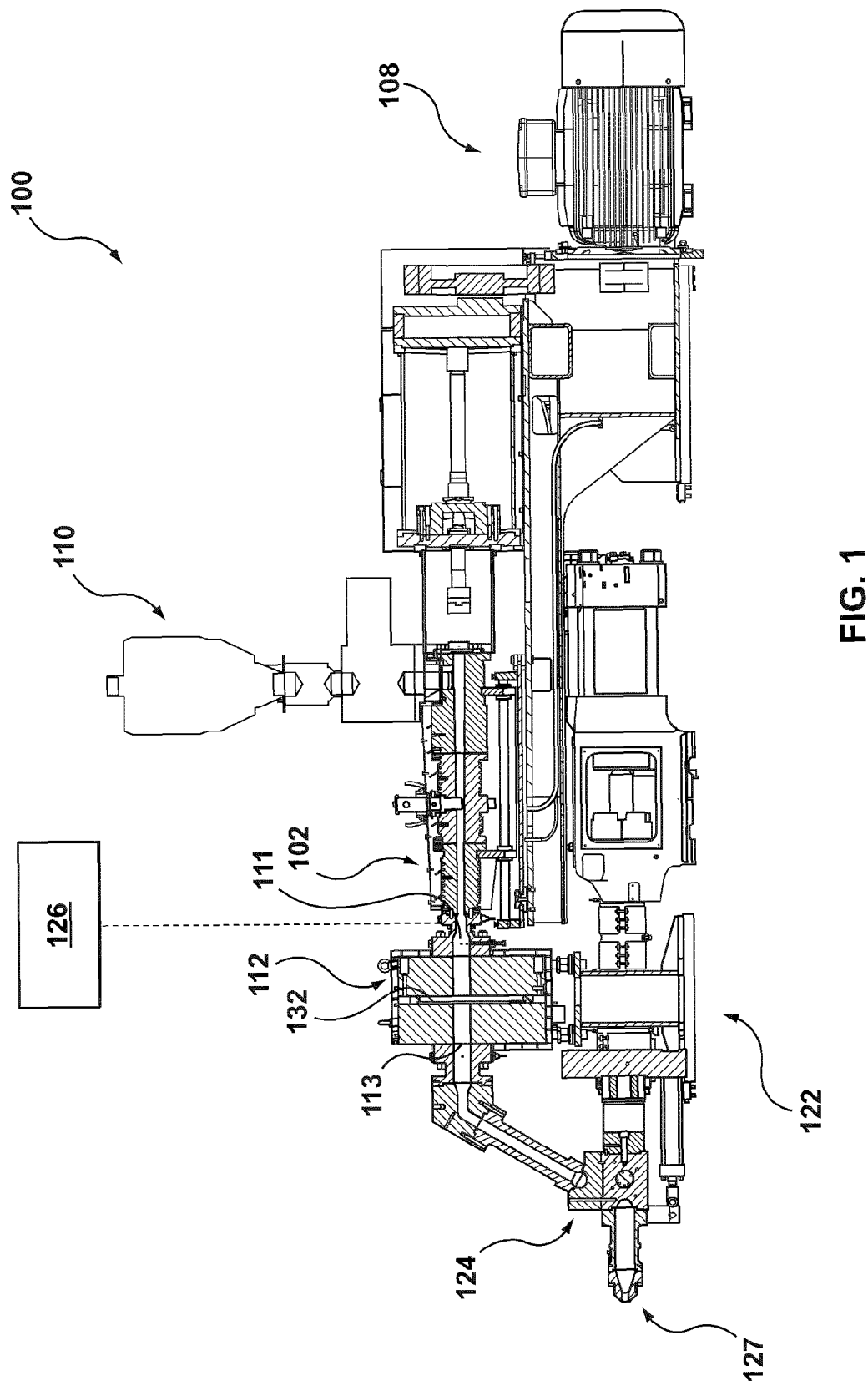
FIG. 1 depicts a partially sectioned front view of an injection unit implemented according to a non-limited embodiment of the present invention.
Figure 2:
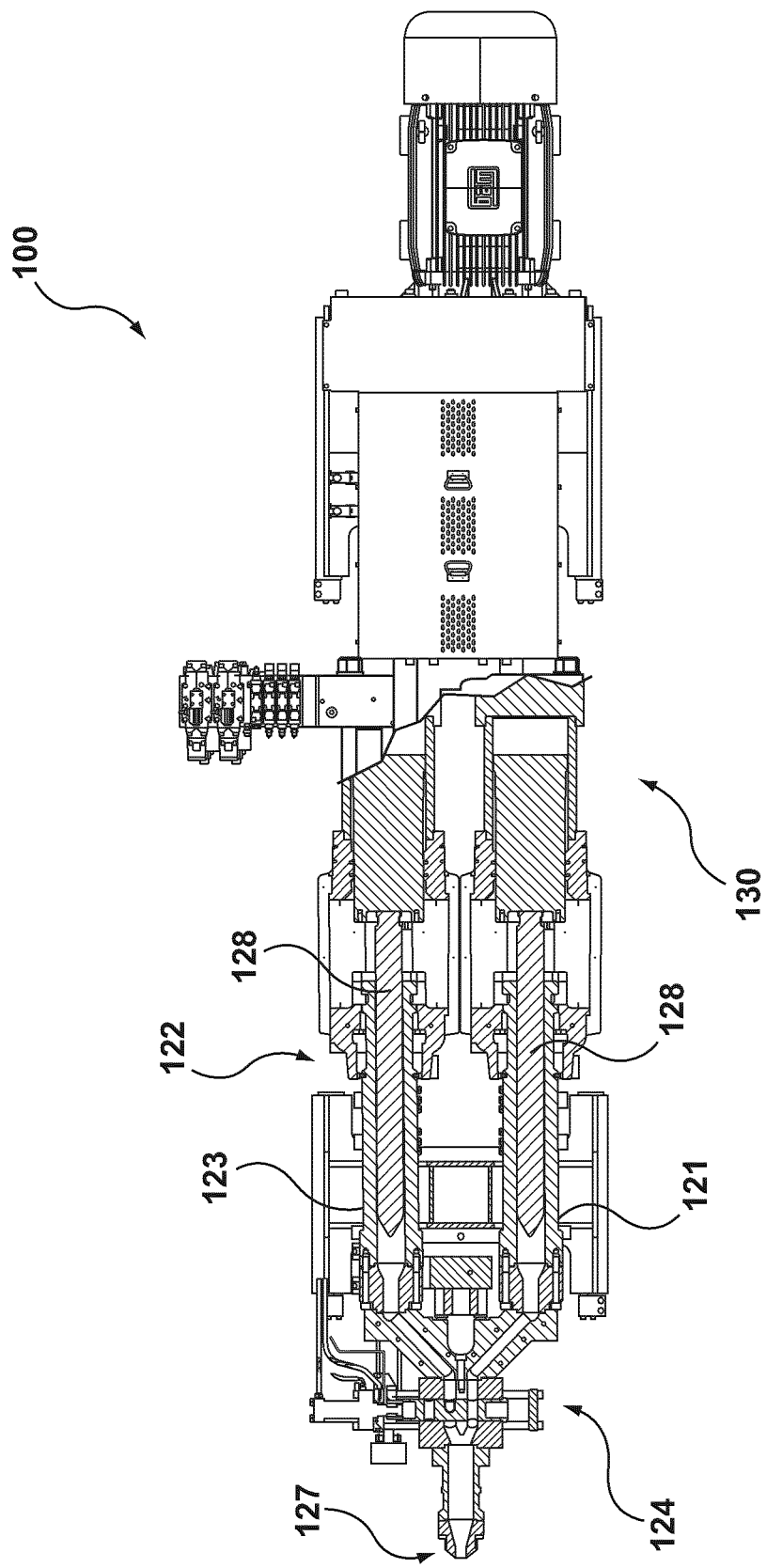
FIG. 2 depicts a partially sectioned top view of the injection unit of FIG. 1.

With reference to FIG. 1 and FIG. 2, an injection unit 100 implemented in accordance with non-limiting embodiments of the present invention, will now be described in greater detail, in which figures, FIG. 1 depicts a partially sectioned front view of the injection unit 100 and FIG. 2 depicts a partially sectioned top view of the injection unit 100.

Within the instantly illustrated embodiment, the injection unit 100 is of a two-stage type and to that extent, the injection unit 100 comprises an extruder 102 and a melt accumulator 122. The extruder 102 comprises a housing (not separately numbered) that houses a screw (not depicted) for plasticizing raw material into molten material, as will be described in greater detail herein below. In some embodiments of the present invention, the extruder 102 can be implemented as a twin screw extruder and, to that end, the extruder 102 can house a set of two screws (not visible). The extruder 102 (or to be more precise, the screw within the extruder 102) is actuated by a screw actuator 108. In the specific non-limiting embodiment of the present invention, the screw actuator 108 comprises an electric motor coupled to the extruder 102 via a gear box (not separately numbered); however, this need not be so in every embodiment of the present invention. As such, it should be appreciated that the screw actuator 108 can be implemented differently, such as a hydraulic actuator, a mechanical actuator or a combination thereof. Within the instantly illustrated embodiment, the extruder 102 can operate in a continuous plasticizing manner (i.e. extruder 102 can be implemented as a continuous extruder). In other words, the extruder 102 is structured to continuously melt, in use, molding material.

In the specific non-limiting embodiment depicted herein, the screw actuator 108 imparts a rotational movement onto the screw of the extruder 102 and it is this rotational movement that performs a dual function: (a) plasticizing of the raw material and (b) transfer of the raw material into the melt accumulator 122, as will be described in greater detail herein below. As such, within this implementation, the screw of the extruder 102 is not associated with a reciprocal movement. In other words, the screw of the extruder 102 is implemented as a non-reciprocating screw.

The injection unit 100 further includes a material feeder 110 coupled to an inlet (not separately numbered) of the injection unit 100. The material feeder 110 is configured to supply raw material to the extruder 102. The material feeder 110 can be configured as a controlled (or metered) feeder or as a continuous feeder.

In a specific non-limiting embodiment of the present invention, the raw material is PET. In alternative embodiments, other materials or a mix of materials can be used. In a particular implementation of the embodiments of the present invention, the raw material includes a combination of virgin raw material and recycled raw material, in a particular proportion. The virgin raw material (which can come in a form of pellets, for example) and the recycled raw material (which can come in a form of flakes, for example) can be mixed at the material feeder 110 or at another upstream device (not depicted), such as a drier (not depicted), for example. In additional embodiments of the present invention, the raw material and the virgin material can be mixed within the extruder 102 itself, which is applicable in those instances, where the raw material and the recycled material are fed through separate inlets.

In a particular scenario, the raw material fed through the material feeder 110 may include 25% of the recycled raw material and 75% of the virgin raw material. In another particular scenario, the raw material may include 50% of the recycled raw material and 50% of the virgin raw material. In yet another particular scenario, the raw material may include 75% of the recycled raw material and 25% of the virgin raw material. Naturally, the exact combination of the raw material used can be different. It should be further noted that embodiments of the present invention can be applied to the injection unit 100 that processes only virgin raw material or only recycled raw material.

In addition to the material feeder 110, in some embodiments of the present invention, there may be provided an additive feeder (not depicted) for adding additional substances, such as for example colorants, acetaldehyde (AA) blockers and the like, to the extruder 102. Such additive feeders are well known in the art and, as such, will not be described here at any length.

Generally speaking, the melt accumulator 122 is configured to buffer the molding material being molten by the extruder 102 and to transfer the molding material towards a nozzle 127 for injection into a molding cavity (not depicted) or a plurality of molding cavities (not depicted). Within the specific non-limiting embodiment being depicted herein, the melt accumulator 122 is implemented as a dual melt accumulator and to that extent the melt accumulator 122 can include two instances of the melt accumulator 122—a first melt accumulator 121 and a second melt accumulator 123, selectively fluidly coupled to the extruder 102, as will be described in greater detail herein below. In alternative non-limiting embodiments of the present invention, the melt accumulator 122 can include only a single instance of the melt accumulator 122.

Each of the first melt accumulator 121 and the second melt accumulator 123 includes an injection plunger 128 operatively disposed within the respective one of the first melt accumulator 121 and the second melt accumulator 123. The injection plunger 128 is actuated by a respective one of an injection plunger actuator 130, which in this particular embodiment of the present invention is implemented as a piston which actuates the injection plunger 128 via hydraulic means. Within these embodiments, the injection plunger actuator 130 may be associated with a servo-valve (not depicted) or other compressible fluid flow control means for controlling the flow rate of compressible fluid used for actuation of the injection plunger actuator 130. However, in alternative non-limiting embodiments of the present invention, the injection plunger 128 can be actuated by a different type of an actuator (not depicted), such as mechanical actuator, electrical actuator and the like.

There is also provided a distribution assembly 124, located fluidly-in-between the extruder 102 and the melt accumulator 122. The distribution assembly 124 is implemented as a distribution valve (such as a linear shuttle valve and the like) and is configured to selectively fluidly connect:
  (a) the extruder 102 to the first melt accumulator 121 while connecting the second melt accumulator 123 to the nozzle 127, which provides for fluid communication with a molding cavity (not depicted) either directly or via a melt distribution system (not depicted), such as a hot runner (not depicted) for enabling for melt transfer from the extruder 102 to the first melt accumulator 121 and melt injection from the second melt accumulator 123 into the molding cavity (not depicted) via the nozzle 127;
  (b) the extruder 102 to the second melt accumulator 123 while connecting the first melt accumulator 121 to the nozzle 127, for enabling for melt transfer from the extruder 102 to the second melt accumulator 123 and melt injection from the first melt accumulator 121 into the molding cavity (not depicted) via the nozzle 127.

There is also provided a melt filter 112. Generally speaking, the purpose of the melt filter 112 is to remove contaminants (such as impurities and other foreign matter) from the molding material having been molten in the extruder 102.

Within this particular non-limiting embodiment and generally speaking, the melt filter 112 is located fluidly-in-between the extruder 102 and the melt accumulator 122. The purpose of the melt filter 112 is to filter impurities and other foreign matters from the plasticized material being transferred from the extruder 102 to the melt accumulator 122. The specific implementation for the melt filter 112 is not specifically limited and, as an example, an off-the-shelf filter from Gneuss Inc. of Matthews, N.C. (www.gneuss.com) can be used to implement the melt filter 112.

The melt filter 112 comprises a filter inlet 111 for allowing an inflow of molding material to be filtered and a filter outlet 113 to allow for an outflow of the filtered molding material. The melt filter 112 further comprises a filtering member 132 located in-between a pair of locating plates (not numbered), which are in turn located between the filter inlet 111 and filter outlet 113. In some embodiments of the present invention, the filtering member 132 can be implemented as a rotational filtering member 132 with a back flush option or, in other words, be implemented as a backflushable filter. Within these embodiments, where backflushing feature is used, the melt filter 112 can also be associated with a drool outlet (not depicted) for allowing material that used for backflushing the melt filter 112 to drool out.

Also, provided within the architecture of FIG. 1 and FIG. 2 is a controller 126 (only depicted in FIG. 1 for the sake of simplicity). Controller 126 can be implemented as a general-purpose or purpose-specific computing apparatus that is configured to control one or more operations of the injection unit 100. It is also noted that the controller 126 can be a shared controller that controls operation of an injection molding machine (not depicted) that houses the injection unit 100 and/or other auxiliary equipment (not depicted) associated therewith.

Amongst numerous functions that can be controlled by the controller 126, some include (but are not limited to):
  (i) Controlling the screw actuator 108 and more specifically the speed of rotation of the screw (not depicted) of the extruder 102;
  (ii) Controlling the distribution assembly 124 for selectively implementing the melt transfer and melt injection switching between the two instances of the melt accumulator 122, as has been discussed above;
  (iii) Controlling the material feeder 110, where the material feeder 110 is implemented as controlled feeder, also referred to sometimes by those of skill in the art as a volumetric feeder;
  (iv) Controlling the above-mentioned additive feeder (not depicted) in those embodiments where such additive feeder is provided;
  (v) Controlling the above-mentioned servo-valve.

It should be noted that not all of these functions need to be performed by the controller 126 in each and every embodiment of the present invention.

Within the instantly illustrated embodiment, it can be said that it is the melt accumulator 122 that defines a melt accumulation volume, where the molding material is accumulated for the first time after being molten by the extruder 102. The melt accumulation volume is a volume configured to accumulate and hold amount of the molding material sufficient for downstream processing, such as, for transferring into a molding cavity or a plurality of molding cavity (not depicted) located downstream of the melt accumulation volume. Recalling that within these embodiments, the extruder 102 is configured to operate in a continuous manner, no melt accumulation volume is defined within the extruder 102, the molten material continuously exits the extruder 102 towards the melt accumulator 122. Accordingly, within this embodiment of the present invention, the melt filter 112 is located before the melt accumulation volume, which in this case is defined within the melt accumulator 122.

Figure 3:
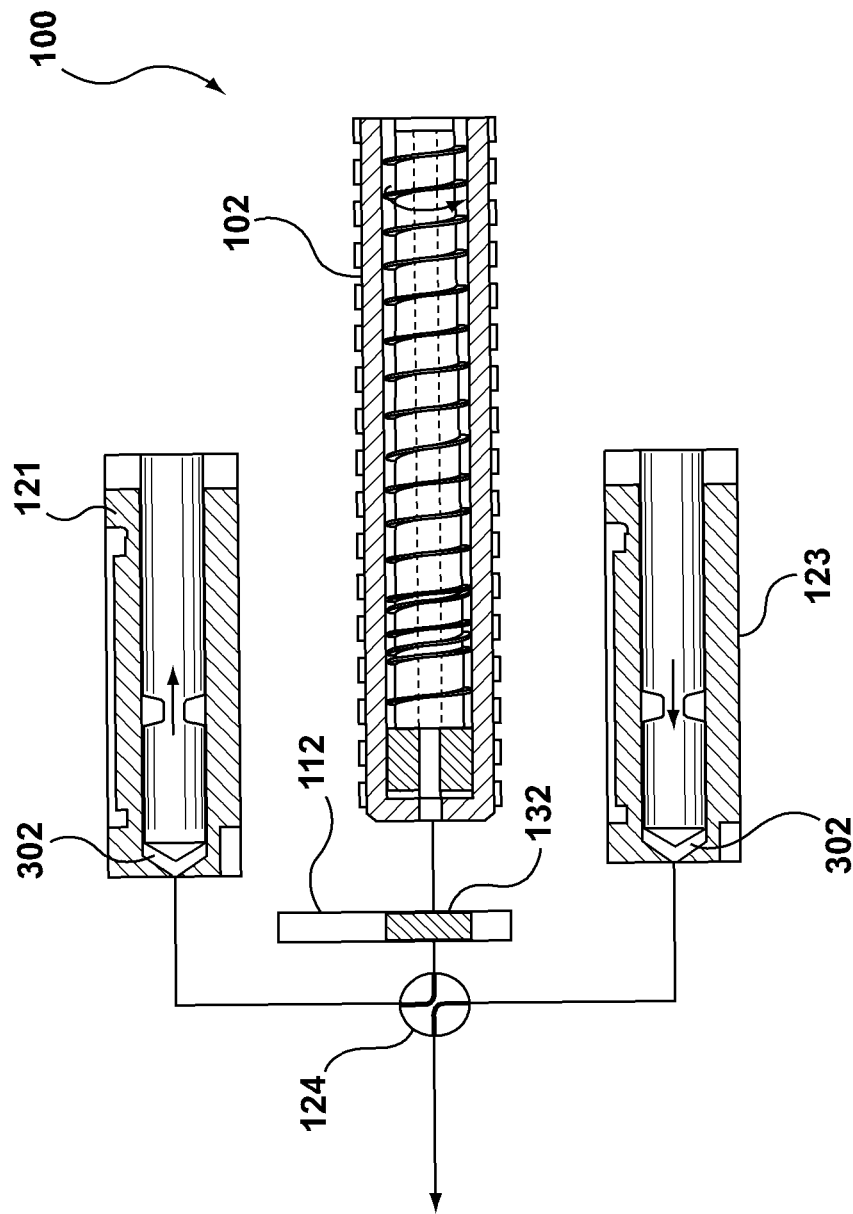
FIG. 3 is a schematic representation of a portion of the injection unit of FIG. 1 and FIG. 2.

Schematically, this is demonstrated with reference to FIG. 3, which depicts a portion of the injection unit 100 of FIG. 1 and FIG. 2. More specifically, FIG. 3 depicts the extruder 102, as well as the first melt accumulator 121 and the second melt accumulator 123 selectively coupled to the extruder 102 via the distribution assembly 124 (which in this illustration is implemented as a rotary valve, unlike a linear shuttle valve in FIG. 1 and FIG. 2). Within these embodiments, each of the first melt accumulator 121 and the second melt accumulator 123 define a respective one of a melt accumulation volume 302, where a volume of the molding material is accumulated for the first time after being molten by the extruder 102. The melt accumulation volume 302 is a volume configured to accumulate and hold amount of the molding material sufficient to transfer into a molding cavity or a plurality of molding cavities (not depicted) located downstream of the melt accumulation volume 302.

As is shown in FIG. 3, the melt filter 112 is positioned before the melt accumulation volume 302.

Figure 4:
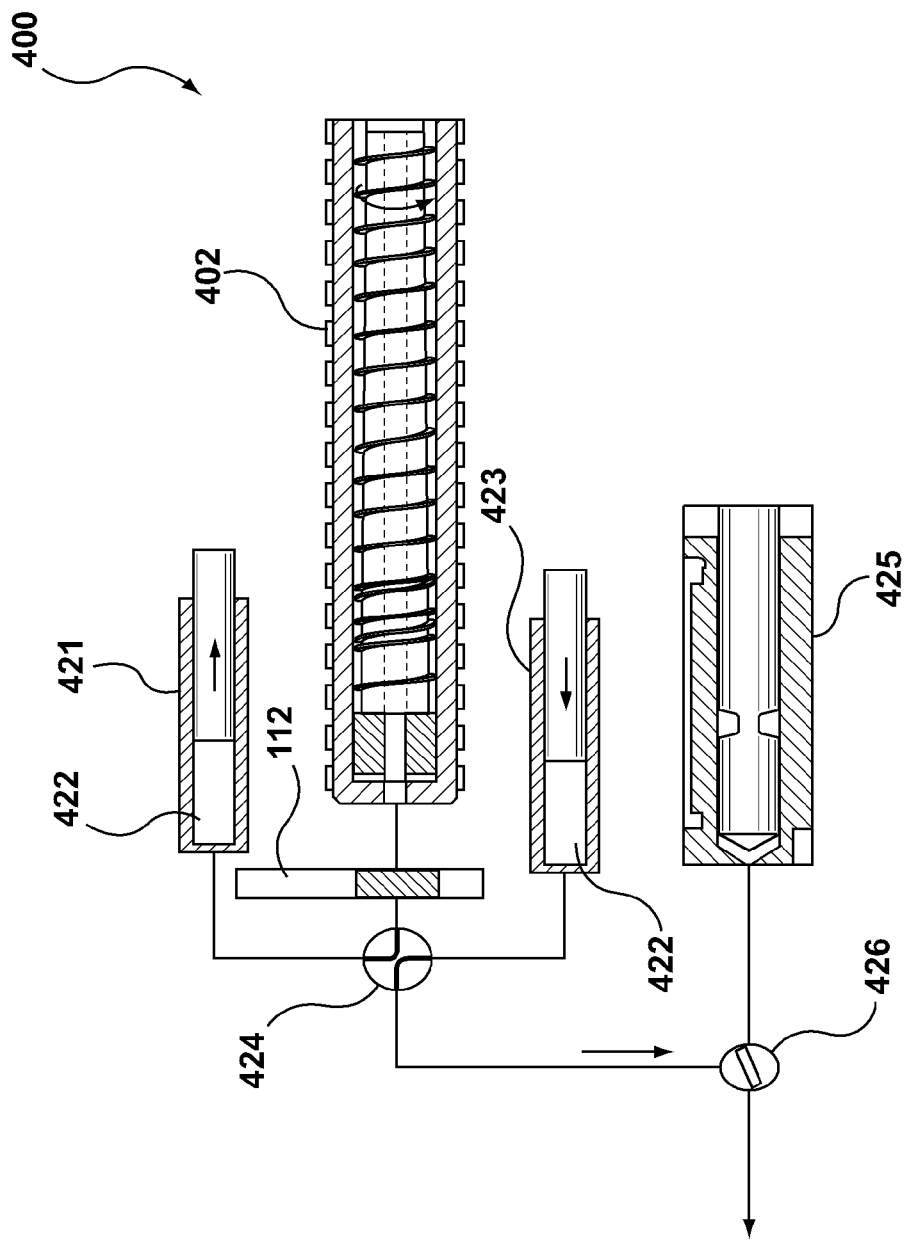
FIG. 4 is a schematic representation of a portion of an injection unit implemented in accordance with another non-limiting embodiment of the present invention, which illustrates an alternative non-limiting embodiment for placing the filter.

With reference to FIG. 4, an alternative non-limiting embodiment for placing the melt filter 112 will now be described. FIG. 4 depicts a portion of an alternative implementation for an injection unit 400. Injection unit 400 can be implemented substantially similar to the injection unit 100 other than for the specific differences to be described herein below.

Injection unit 400 includes inter alia an extruder 402, which is implemented in substantially similar manner to the extruder 102 of embodiments of FIG. 1 and FIG. 2. The injection unit 400 further includes a first melt accumulator 421 and a second melt accumulator 423 selectively coupled to the extruder 402 via a first distribution assembly 424 (which in this illustration is implemented as a rotary valve, but can also be implemented as a linear shuttle valve similar to that of FIGS. 1 and 2 or any other suitable means). Within these embodiments there is also provided a third melt accumulator 425, selectively coupled to the first melt accumulator 421 and the second melt accumulator 423 via the first distribution assembly 424 and a second distribution assembly 426, which can be implemented as a rotary valve or the like. Within these embodiments of the present invention, the combination of the first distribution assembly 424 and the second distribution assembly 426 are configured to selectively fluidly connect:
  (a) the extruder 402 to one of the first melt accumulator 421 and the second melt accumulator 423, while connecting the other one of the first melt accumulator 421 and the second melt accumulator 423 to the third melt accumulator 425 (via the second distribution assembly 426);
  (b) the third melt accumulator 425 to either the first distribution assembly 424 (or, in other words, to one of the first melt accumulator 421 and the second melt accumulator 423) or to the molding cavity (not depicted) via the nozzle 127 (see FIG. 2).

Within these embodiments, the third melt accumulator 425 is implemented substantially similar to the first melt accumulator 121 and the second melt accumulator 123 of the embodiments of FIG. 1 and FIG. 2.

The first melt accumulator 421 and the second melt accumulator 423 are configured to accumulate and transfer molding material from the extruder 402 and, to that extent, each define a respective one of a melt accumulation volume 422, where the molding material is accumulated for the first time after being molten by the extruder 402. The melt accumulation volume 422 is a volume configured to accumulate and hold amount of the molding material sufficient to transfer into the third melt accumulator 425, which in turn is configured to inject it into a molding cavity or a plurality of molding cavities (not depicted).

It is noted that within these embodiments, it is the third melt accumulator 425 that does injection of the molding material, while the first melt accumulator 421 and the second melt accumulator 423 only do transfer of the molding material to the third melt accumulator 425. To that extent, plungers (not separately numbered) and plunger actuators (not depicted) associated with the first melt accumulator 421 and the second melt accumulator 423 may be associated with lower pressure requirements compared to the third melt accumulator 425, for example.

In other words, within these embodiments of the present invention, the first melt accumulator 421 and the second melt accumulator 423 can be configured for the accumulation and transfer functions exclusively, while the third melt accumulator 425 can be configured for accumulation and injection functions.

As is shown in FIG. 4, the melt filter 112 is positioned before the melt accumulation volume 422. Within these embodiments of the present invention, an additional technical effect may be associated with provision of a single instance of the third melt accumulator 425 that executes the injection function, while the first melt accumulator 421 and the second melt accumulator 423 are configured for the accumulation and transfer functions exclusively. Namely, the additional technical effect may include better shot-to-shot shot volume repeatability.

Alternatively, the third melt accumulator 425 can be implemented as a secondary extruder unit. Within these embodiments, the extruder 402 can be used to melt recycled raw material and the secondary extruder can be used to melt virgin raw material. The output from the extruder 402 can be coupled to a secondary input (not depicted) of the secondary extruder, which can be in the middle of the secondary extruder. A special reciprocating screw design (not depicted, but generally known in the art) can be adapted the filtered molding material coming in and virgin raw material being plasticized.

Generally speaking, it can be said that the melt filter 112 is placed before the melt accumulation volume and, therefore, can be said to be positioned on a melt transfer path and not on a melt injection path. A technical effect of embodiments of the present invention includes exposing the melt filter 112 to flow rates that are four to five times lower that if the melt filter 112 was positioned on the injection path. This, in turn, results in ability to reduce costs by deploying a smaller size of a filter. Another technical effect of embodiments of the present invention includes exposing the melt filter 112 to substantially constant flow rates. Additionally, the melt filter 112 is not exposed to pressure shocks, which in turn, can prolong the useful life of the melt filter 112. It should be noted that not every technical effect, in its entirety, needs to be enjoyed in each and every embodiment of the present invention.

The description of the embodiments provides examples of the present invention, and these examples do not limit the scope of the present invention. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of Letters Patent are limited only by the scope of the following claims:

What is claimed is:

1. An injection unit, comprising:
an extruder that is structured to continuously melt, in use, a molding material;
a nozzle that is connectable, in use, to a mold;
a melt accumulator that is structured to selectively buffer and transfer, in use, the molding material towards the nozzle, the melt accumulator including a first melt accumulator and a second melt accumulator selectively connectable to the extruder via a distribution assembly, and wherein each of the first melt accumulator and the second melt accumulator defines a respective melt accumulation volume; the melt accumulation volume being configured to accumulate and hold, for a first time after being molten by the extruder a volume of molding material sufficient to transfer for downstream processing;
a melt filter placed before the melt accumulation volume, such that the molding material if subjected to filtering prior to entering the melt accumulation volume, the melt filter being configured to remove contaminants from the molding material.

2. The injection unit of claim 1, wherein the extruder is configured as a twin screw extruder.

3. The injection unit of claim 1, wherein the melt filter is implemented as a backflushable filter.

4. The injection unit of claim 1, wherein the melt accumulator further comprises a third melt accumulator selectively connectable to one of (a) one of the first melt accumulator and the second melt accumulator and (b) the nozzle via a second distribution assembly.

5. The injection unit of claim 4, wherein the extruder is configured as a twin screw extruder.

6. The injection unit of claim 4, wherein the first melt accumulator and the second melt accumulator are configured to perform accumulation and transfer function exclusively.

7. The injection unit of claim 4, wherein the first melt accumulator and the second melt accumulator are configured to perform accumulation and transfer function exclusively and the third melt accumulator is configured to perform accumulation and injection function.

8. The injection unit of claim 1, wherein the distribution assembly is implemented as a linear shuttle valve.

9. The injection unit of claim 1, wherein the distribution assembly is implemented as a rotary valve.

10. The injection unit of claim 1, wherein the extruder comprises a non-reciprocating screw.

* * * * *